United States Patent
Cymbal et al.

(10) Patent No.: US 8,443,695 B2
(45) Date of Patent: May 21, 2013

(54) ADJUSTABLE STEERING COLUMN ASSEMBLY WITH BREAK-AWAY LEVER

(75) Inventors: William D. Cymbal, Freeland, MI (US); Jason R. Ridgway, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 861 days.

(21) Appl. No.: 12/011,858

(22) Filed: Jan. 30, 2008

(65) Prior Publication Data

US 2009/0188342 A1 Jul. 30, 2009

(51) Int. Cl.
*B62D 1/18* (2006.01)
(52) U.S. Cl.
USPC .................. 74/493; 280/777; 74/519
(58) Field of Classification Search
USPC ............. 74/492, 493, 519; 280/777; 180/274, 180/275
See application file for complete search history.

(56) References Cited

U.S. PATENT DOCUMENTS

| | | | | |
|---|---|---|---|---|
| 3,368,421 A | * | 2/1968 | Hass et al. | 74/493 |
| 3,868,864 A | * | 3/1975 | Durkee et al. | 74/492 |
| 3,918,322 A | * | 11/1975 | Frier et al. | 74/519 |
| 4,811,921 A | | 3/1989 | Whitaker et al. | |
| 5,117,707 A | | 6/1992 | Kinoshita et al. | |
| 6,616,185 B2 | | 9/2003 | Manwaring et al. | |
| 6,659,504 B2 | | 12/2003 | Manwaring et al. | |
| 6,742,411 B2 | * | 6/2004 | Aoki et al. | 74/512 |
| 7,028,579 B2 | | 4/2006 | Irish et al. | |
| 7,077,432 B2 | * | 7/2006 | Manwaring et al. | 280/777 |
| 7,263,910 B2 | | 9/2007 | Maida et al. | |
| 7,434,648 B2 | * | 10/2008 | Hayashi | 180/274 |
| 2005/0167962 A1 | * | 8/2005 | Sato et al. | 280/775 |
| 2005/0200113 A1 | * | 9/2005 | Cymbal et al. | 280/777 |
| 2007/0157756 A1 | | 7/2007 | Cymbal et al. | |

FOREIGN PATENT DOCUMENTS

EP    1806269 A1 *  7/2007

* cited by examiner

*Primary Examiner* — Alan Waits
(74) *Attorney, Agent, or Firm* — Cantor Colburn LLP

(57) ABSTRACT

An adjustable steering column assembly having a repositionable steering column and a break-away lever arm. The lever arm has a first mounting interface and an adjustment assembly member operably coupled with the steering column has a second mounting interface. Engagement of the first and second mounting interfaces mounts the lever arm on the adjustment assembly member. Movement of the lever arm rotates the adjustment assembly member to facilitate the repositioning of the steering column. Applying a breakaway force exceeding a threshold value to the lever arm disengages the mounted lever arm from the adjustment assembly member by relative translational movement between the first and second mounting interfaces. Some embodiments employ a threaded fastener installed to a predetermined torque to bias the first and second mounting interfaces into engagement. The threaded fastener can be installed such that it may be non-frangibly disengaged by displacement through the open end of a slot.

18 Claims, 6 Drawing Sheets

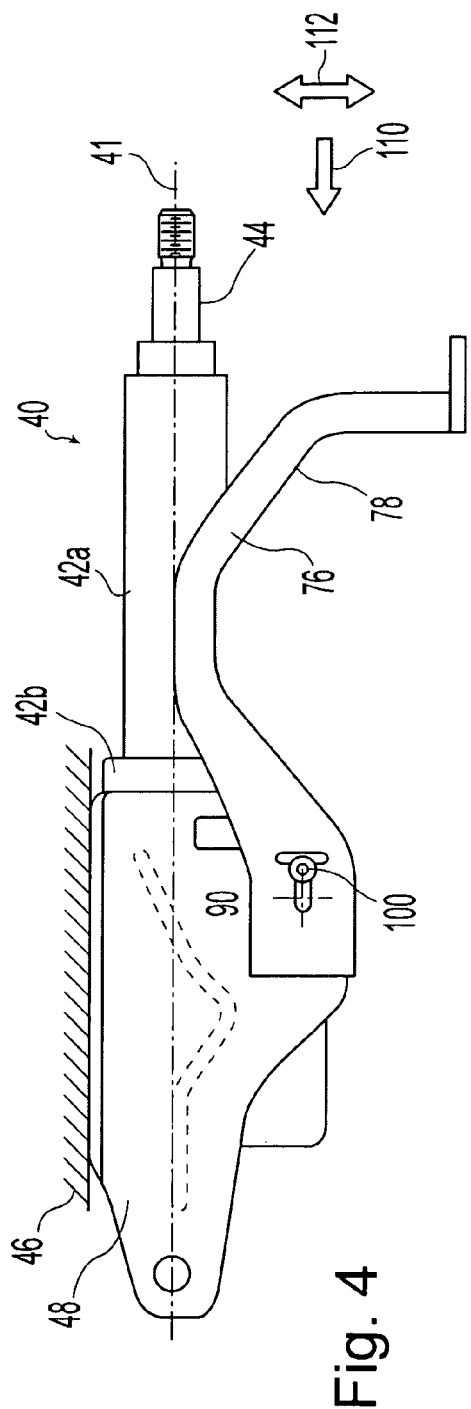
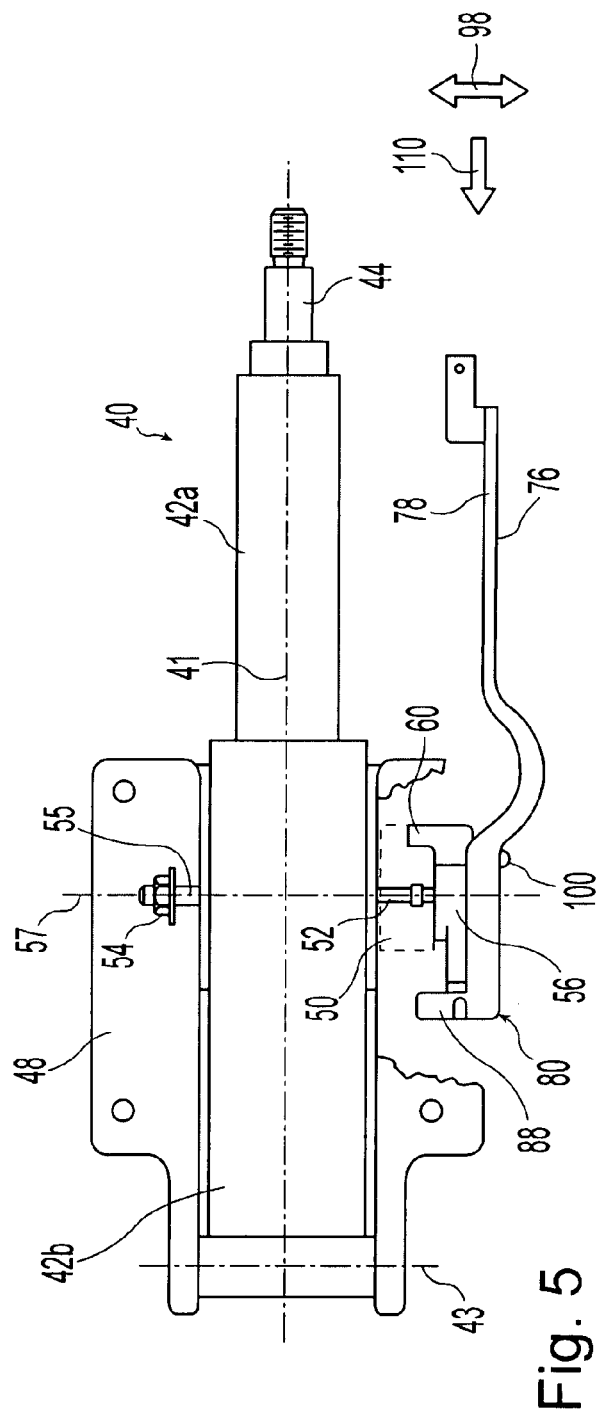
Fig. 4
Fig. 5

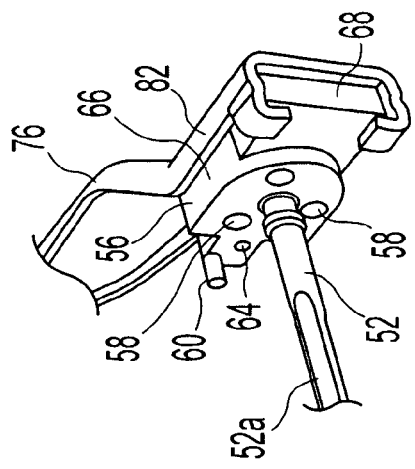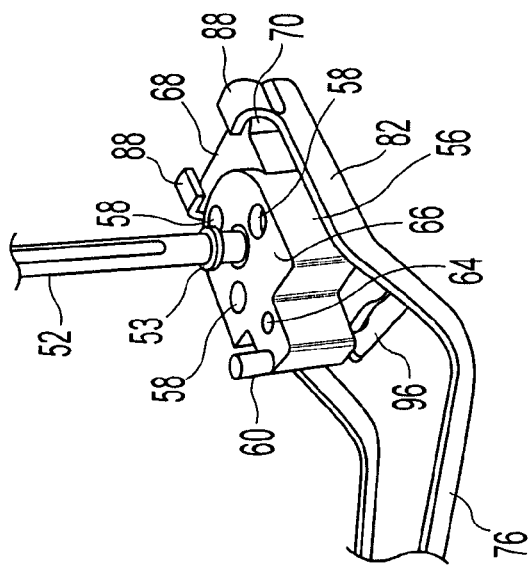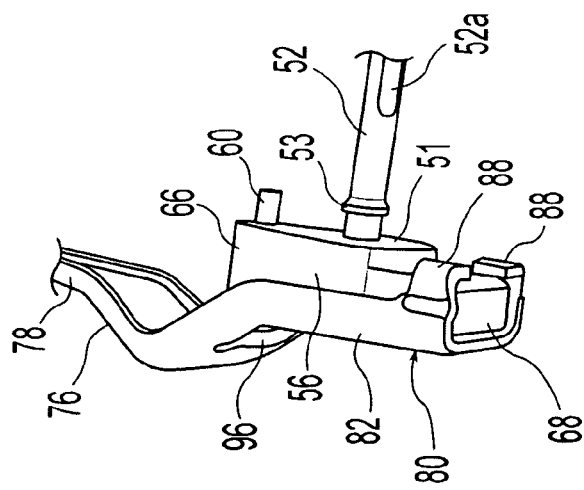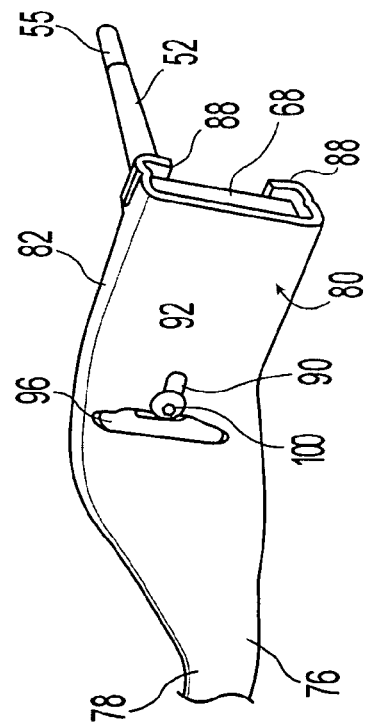

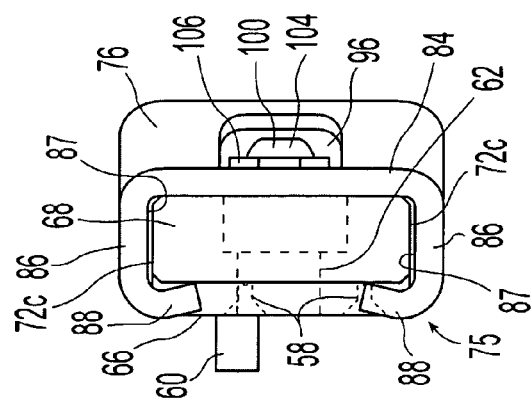
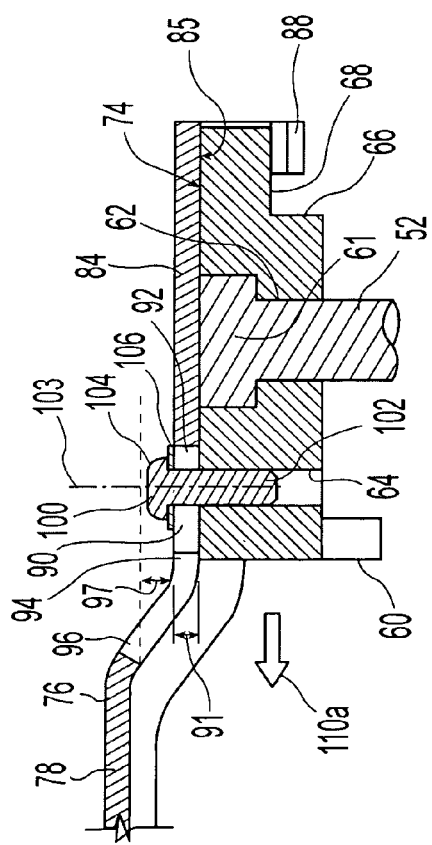
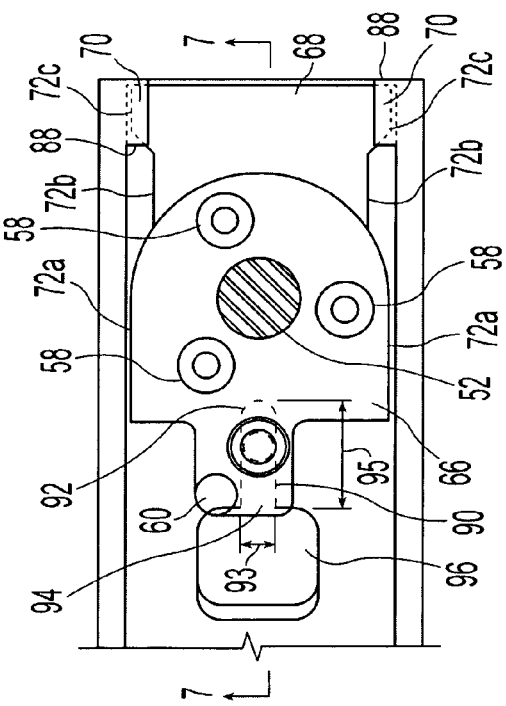
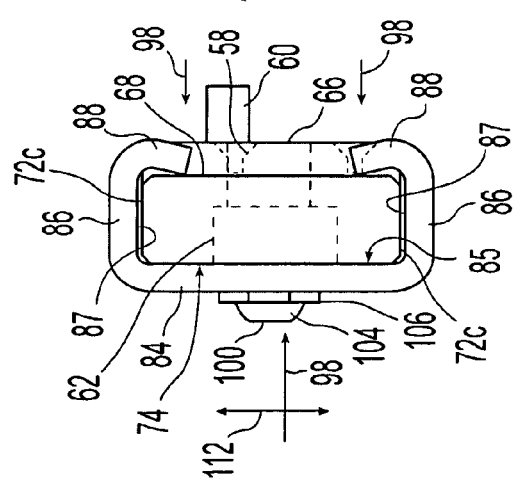

ADJUSTABLE STEERING COLUMN ASSEMBLY WITH BREAK-AWAY LEVER

BACKGROUND OF THE INVENTION

1. Field of the Invention

The present invention relates to adjustable steering columns for vehicles and, more particularly, to an adjustable steering column having a break-away lever.

2. Description of the Related Art

The use of adjustable steering columns in automobiles and other vehicles is well known. Oftentimes, such steering columns have a steering shaft that extends through a pair of telescoping steering jacket members. Typically, these steering columns can be repositioned by pivoting the steering column about a tilt axis and by adjusting the axial length of the steering column. A locking mechanism is provided and, in its locked configuration, secures the steering column in a selected tilt and axial position and, in its unlocked configuration, releases the steering column so that it may be repositioned. Many such locking mechanisms include an actuating lever that is manually operated by the driver of the vehicle to move the locking mechanism between its locked and its unlocked configurations.

Known adjustable steering columns also often include an energy absorption feature. If the operator of the vehicle impacts the steering wheel during a collision event, such features absorb part of the energy of the impact force as the steering column collapses to thereby reduce the peak impact forces that are imparted to the operator of the vehicle. Depending on the steering column design, it may be possible for the operator of the vehicle to impact the actuating lever of the tilt and axial locking mechanism in such a collision event. It is known to use a "break-away" actuating lever with such tilt and axial locking mechanisms to limit the impact forces that can be imparted by the actuating lever.

FIGS. 1-3 illustrate a break-away lever that can be used with locking mechanisms for adjustable steering columns. It is intended that the impact force required to break-away the lever arm illustrated in FIGS. 1-3 from the steering column fall within the range of between 450 and 600 Newtons.

FIG. 1 is a partial exploded view of an adjustable steering column assembly 10 that illustrates one of two sidewalls between which is positioned a pair of telescoping steering jacket members. A camming assembly 14 is installed adjacent the exterior of sidewall 12 and forms a part of the locking mechanism that is used to secure the steering column in a desired tilt and axial position in a manner well known in the art. Inner camming assembly member 16 is fixed adjacent sidewall 12 and includes an arcuate recess 18. Intermediate camming assembly member 20 is positioned between outer camming assembly member 22 and inner member 16. Three camming pins 23 are seated in bores in intermediate member 20.

A multi-piece locking bolt 24 extends through camming assembly 14, sidewall 12, the steering column and the opposite sidewall. Lever arm 26 is secured to outer member 22 in which the head of locking bolt 24 is seated. Outer member 22 includes a limit pin 28 that is seated in arcuate recess 18. The interaction of limit pin 28 and arcuate recess 18 limits the arc through which outer member 22 may be pivoted about the axis defined by locking bolt 24.

Lever arm 26 is secured to outer member 22 and pivotal motion of lever arm 26 pivots outer member 22. As lever arm 26 and outer member 22 are pivoted, pins 23 are seated and unseated from three depressions 25 in outer member 22. When pins 23 are seated in depressions 25, outer member 22 is positioned relatively close to inner member 16. When the pivotal motion of outer member 22 unseats pins 23 from depressions 25, outer member 22 and the head of bolt 24 seated therein are biased away from inner member 16.

When lever arm 26 is pivoted to its lowermost (unlocked) position, pins 23 are seated in depressions 25 and pivoting lever arm 26 to its uppermost (locked) position closest to the steering column assembly unseats pins 23 from depressions 25 biasing outer member 22 outwardly from inner member 16. When lever arm 26 is in its locked position and outer member 22 and the head of locking bolt 24 is biased away from inner member 16, the two sidewalls are biased together and secure the steering column in position. Movement of lever arm 26 to its unlocked position allows outer member 22 to move toward inner member 16 which thereby releases the steering column from its securement between the two sidewalls and permits the tilting and axial adjustment of the steering column. FIG. 2 illustrates one of the pins 23 in a seated condition within a depression 25 on outer member 22.

FIGS. 2 and 3 provide a more detailed view of lever arm 26 and its mounting to outer member 22. Outer member 22 is a metal body that can be formed by either casting or machining while lever arm 26 is formed by stamping a sheet metal material. The forward end of lever arm 26 has a grip 30 mounted thereon which can be grasped by the operator of the vehicle for moving lever arm 26 between its locked and unlocked positions. As best seen in FIG. 2, lever arm 26 is provided with injection holes 32 through which a plastic material 34 is injected. With reference to FIG. 3, plastic material 34 fills the spaces 33 between outer member 22 and lever arm 26 within the C-shaped portion of lever arm 26 in which outer member 22 is disposed. (Plastic material 34 has not been illustrated in FIG. 2.) This plastic material 34 secures outer member 22 and lever arm 26 together. If lever arm 26 is impacted by the operator of the vehicle as indicated by impact force arrow 36, the plastic material 34 securing outer member 22 and lever arm 26 will fail allowing lever arm 26 to become disengaged from outer member 22. The failure of the plastic material 34 required to allow lever arm 26 to be separated from outer member 22 requires at least the partial fracture of the plastic material, e.g., the severing of the sprues filling injection holes 32, and either the further fracture of the plastic material or the breaking of adhesive bonds between the plastic material and one or both of the lever arm 26 or outer member 22.

While providing a break-away lever, the lever illustrated in FIGS. 1-3 has several drawbacks. The injection molding process is labor intensive, and thus expensive, and the loads required to break-away the lever can be erratic due to the variations in the injection pressure, moisture and part variations. Moreover, the imposition of a plastic material between the lever arm and locking assembly requires that torsional and lateral loads imparted by the lever to the locking assembly be transferred through the injection molded plastic material. This undesirably reduces the stiffness of the lever arm as felt by the operator of the vehicle when using the lever under normal conditions to lock and unlock the steering column.

SUMMARY OF THE INVENTION

The present invention provides an adjustable steering column with a break-away lever wherein the lever provides a robust feel to the operator of the vehicle during normal operations but which separates from the steering column when subject to high impact forces as may occur in a collision.

The invention comprises, in one form thereof, an adjustable steering column assembly. The assembly includes a lever arm having a first mounting interface. The lever arm is manually repositionable between a first position and a second position. An adjustment assembly member is also provided and is operably coupled with the steering column assembly. The adjustment assembly member has a second mounting interface. Engagement of the first and second mounting interfaces mounts the lever arm on the adjustment assembly member wherein repositioning of the lever arm between the first and second positions rotates the adjustment assembly member about a rotational axis to thereby facilitate the repositioning of the steering column assembly. At least one securement member is operably coupled with the lever arm and the adjustment assembly member and biases the first and second mounting interfaces into engagement. One of the lever arm and the adjustment assembly member defines an open ended slot. The slot has a width and a length. The length extends between a first end and a second open end. The width of the slot expands at the second open end. The securement member extends through the slot. Applying a breakaway force exceeding a threshold value to the lever arm displaces the securement member along the length of the slot toward the second open end and movement of the securement member through the second open end disengages the mounted lever arm from the adjustment assembly member.

In some embodiments, at least one of the first and second mounting interfaces defines a substantially planar first surface that is bearingly engaged with the other of the first and second mounting interfaces. The relative translational movement between the first and second mounting interfaces which occurs when a breakaway force disengages the lever arm from the adjustment assembly member includes a relative sliding movement along this first surface. This first surface may be oriented substantially perpendicular to the rotational axis. For example, one of the first and second mounting interfaces of such an embodiment may define a C-shaped cross-section having a central portion and two opposing sidewall portions wherein the first surface is defined by the central portion of the C-shaped cross section. The other of the first and second mounting interfaces may be formed by a solid body disposed within the C-shaped cross-section wherein the solid body is engageable with the central portion and has opposite first and second side surfaces which are respectively positioned proximate the first and second sidewall portions of the C-shaped cross-section.

The invention comprises, in another form thereof, an adjustable steering column assembly. The assembly includes a lever arm having a first mounting interface wherein the lever arm is manually repositionable between a first position and a second position. An adjustment assembly member is operably coupled with the steering column assembly and has a second mounting interface. Engagement of the first and second mounting interfaces mounts the lever arm on the adjustment assembly member wherein repositioning of the lever arm between its first and second positions moves the adjustment assembly member between a locking position and an adjustment position to thereby facilitate the repositioning of the steering column assembly. At least one securement member discrete from the lever arm and adjustment assembly member is operably coupled with the lever arm and the adjustment assembly member wherein the securement member exerts a biasing force securely and substantially non-adhesively engaging the first and second mounting interfaces and thereby defines a biasing direction. Applying a breakaway force exceeding a threshold value to the lever arm disengages the mounted lever arm from the adjustment assembly member by relative translational movement between the first and second mounting interfaces. This relative translational movement is at a non-parallel angle to the biasing direction and the disengagement of the lever arm from adjustable assembly member by application of the threshold exceeding force may occur substantially non-frangibly with respect to the securement member.

The invention comprises, in still another form thereof, an adjustable steering column assembly. The assembly includes a lever arm having a first mounting interface wherein the lever arm is manually repositionable between a first position and a second position. An adjustment assembly member is operably coupled with the steering column assembly and has a second mounting interface. Engagement of the first and second mounting interfaces mounts the lever arm on the adjustment assembly member wherein repositioning of the lever arm between its first and second positions moves the adjustment assembly member between a locking position and an adjustment position to thereby facilitate the repositioning of the steering column assembly. A securement member is operably coupled with the lever arm and the adjustment assembly member. The securement member includes a threaded shaft and the shaft defines a shaft axis. The securement member exerts a biasing force parallel with the shaft axis on the lever arm and the adjustment assembly member to thereby securely engage the first and second mounting interfaces. Applying a breakaway force exceeding a threshold value to the lever arm disengages the mounted lever arm from the adjustment assembly member by relative translational movement between the first and second mounting interfaces wherein the relative translational movement is at a non-parallel angle to said shaft axis. The securement member is installed to a predetermined torque whereby the threshold value is within a predetermined range.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 4 is a schematic side view of an adjustable steering column assembly in accordance with the present invention.

FIG. 5 is a partially cutaway schematic top view of the adjustable steering column assembly of FIG. 4.

FIG. 6 is a partial perspective view of a lever arm in accordance with the present invention.

FIG. 7 is another partial perspective view of the lever arm.

FIG. 8 is another partial perspective view of the lever arm.

FIG. 9 is another partial perspective view of the lever arm.

FIG. 10 is a cross sectional view of the lever arm.

FIG. 11 is a side view of the lever arm.

FIG. 12 is an end view of the lever arm.

FIG. 13 is another end view of the lever arm.

Figure 1:
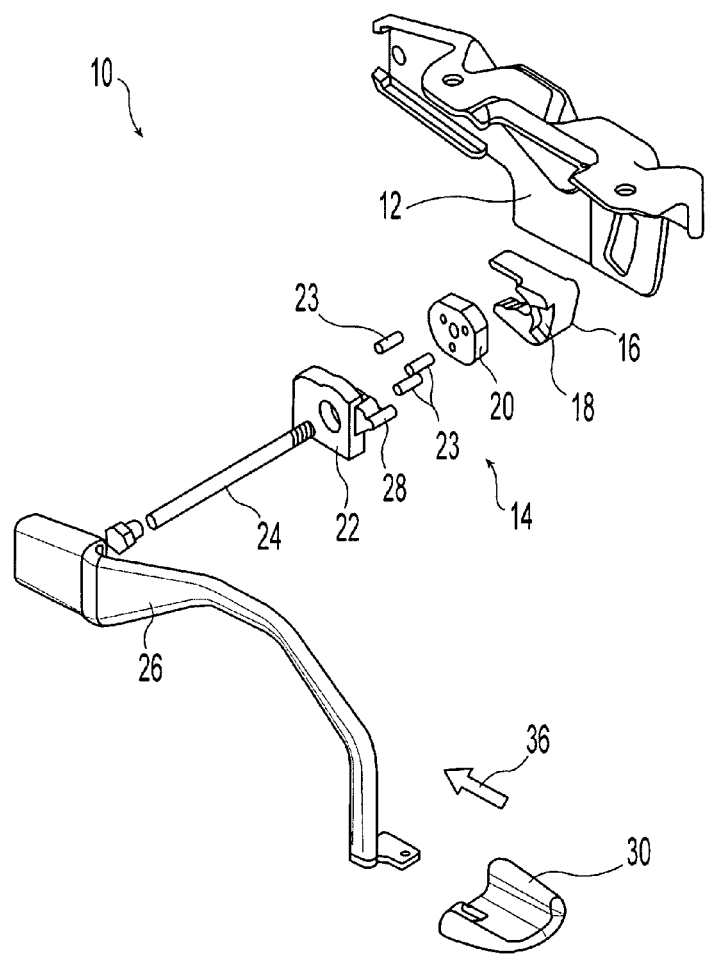
FIG. 1 is an exploded view of a portion of a prior art adjustable steering column assembly.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

An adjustable steering column assembly 40 in accordance with the present invention is depicted in FIGS. 4 and 5. Steering column assembly 40 includes an upper steering jacket member 42a and a lower steering jacket member 42b with a steering shaft 44 extending through steering jackets 42a, 42b. A steering wheel (not shown) is mounted on the end of steering shaft 44. Steering shaft 44 defines a steering shaft axis 41. Upper and lower steering jackets 42a, 42b are telescopingly engaged to enable the axial length of steering column assembly 40 to be adjusted. A mounting bracket 48 is secured to vehicle structure 46 and steering column assembly 40 is pivotally mounted to mounting bracket 48 to allow steering column assembly to be pivoted about tilt axis 43.

A locking or adjustment assembly 50 is used to secure steering column assembly 40 in a desired position, and release column 40 for repositioning. That part of mounting bracket 48 above adjustment assembly 50 in FIG. 5 has been cutaway. Adjustment assembly 50 includes an adjustment assembly member 51. Not shown in FIG. 5 are an inner member and an intermediate member which are similar to those depicted in FIG. 1. A locking bolt shaft 52 extends outwardly from assembly member 51 and passes through the sidewalls of mounting bracket 48. A locking nut 54 is mounted on threaded end 55 of shaft 52 opposite assembly member 51. Shaft 52 also includes a collar 53 and flats 52a.

Figure 2:
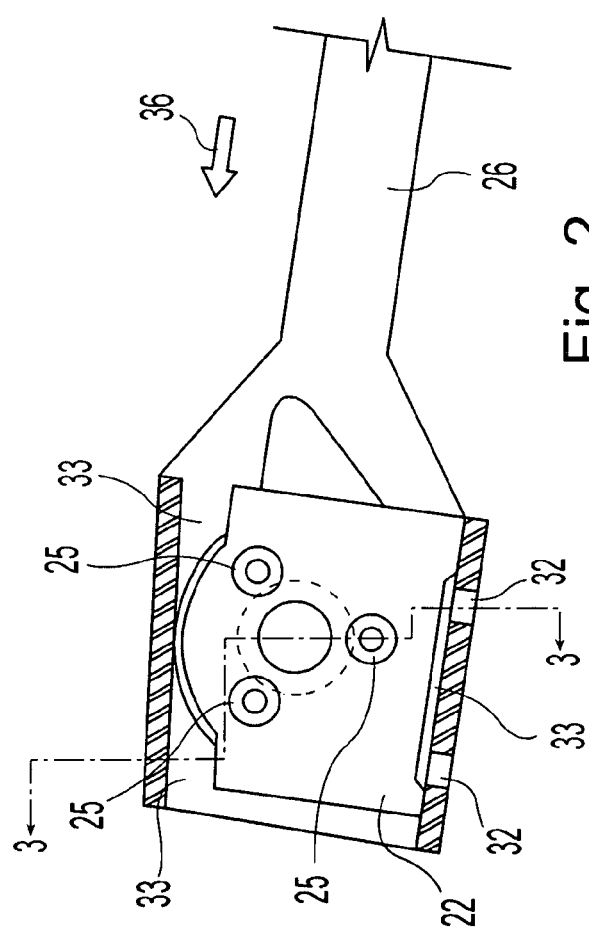
FIG. 2 is a cross sectional view of the prior art assembly of FIG. 1 taken along line 2-2 of FIG. 3.
Figure 3:
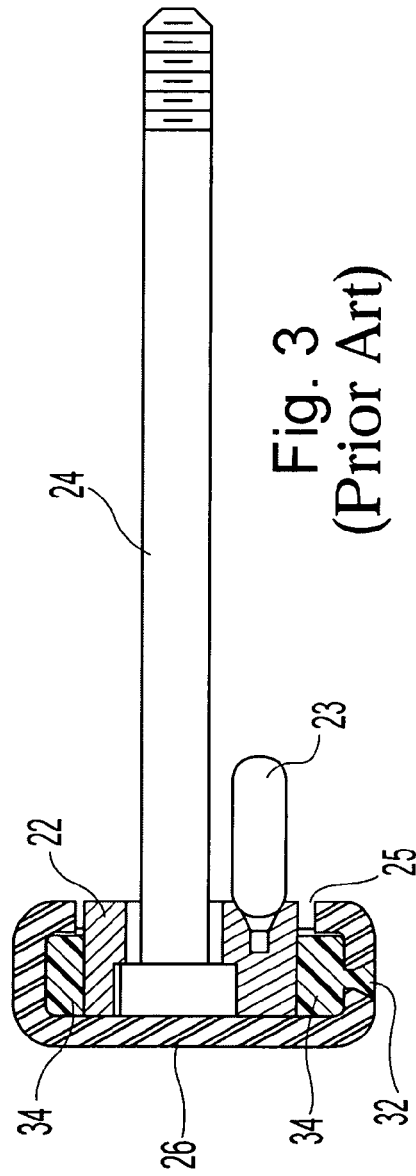
FIG. 3 is a cross sectional view of the prior art assembly of FIG. 1 taken along line 3-3 of FIG. 2.

The solid body 56 of assembly member 51 includes three depressions 58. A bolt head 61 on shaft 52 is seated in a central bore hole 62 of solid body 56 as best seen in FIG. 10. Adjustment assembly 50 functions in a manner similar to the assembly illustrated in FIGS. 1-3 with camming pins being seated in and unseated from depressions 58 formed in solid body 56. A projection 60 extends from solid body 56 into an arcuate recession defined by a member of the adjustment assembly 50 to thereby limit the arcuate range through which assembly member 51 can be rotated. When the camming pins are unseated from depressions 58, assembly member 51 is biased outwardly away from the nearest sidewall of mounting bracket 48 and the steering column is secured in position. When the camming pins are seated within depressions 58, assembly member 51 moves inwardly toward the near sidewall of bracket 48 releasing the steering column assembly and allowing the tilt angle and axial length of the steering column assembly to be adjusted. A breakaway lever arm 76 is mounted on assembly member 51 and is used to rotate assembly member 51 about axis 57 of shaft 52.

The interaction of assembly member 51 with adjustment assembly 50 and the use of an locking/adjustment assembly 50 with a steering column assembly 40 is known to those having skill in the art. Alternative adjustable steering column assemblies and locking/adjustment assemblies may also be used with the breakaway lever arrangement of the present invention. For example, U.S. Pat. No. 6,659,504 B2 by Reife et al. and U.S. Pat. No. 6,616,185 B2 by Manwaring et al. both disclose adjustable steering column assemblies with locking/adjustment assemblies that can be employed with the present invention and the disclosures of both of these patents are hereby incorporated herein by reference.

The mounting of lever arm 76 on assembly member 51 is best understood with reference to FIGS. 6-14. Assembly member 51 includes threaded bore 64 for receiving a securement member 100 which takes the form of a threaded fastener in the illustrated embodiment. Fastener 100 extends through an open ended slot 90 in lever arm 76. Assembly member 51 also includes raised portion 66 on which depressions 58 are located. An extension 68 of assembly member 51 projects from raised portion 66 and includes ears 70. Ductile projecting tabs 88 on lever arm 76 are bent over to engage ears 70 when mounting lever arm 76 on assembly member 51. Assembly member 51 includes a major planar surface 74 facing lever arm 76 and sidesurfaces 72a, 72b, 72c. Major surface 74, sidesurfaces 72a, 72b, 72c, threaded opening 64 and ears 70 all define a mounting interface 75 that is coupled with lever arm 76 to mount the lever arm 76 thereon.

Lever arm 76 includes a forward portion 78 on which a grip (similar to grip 30 shown in FIG. 1) is mounted by which the operator of the vehicle may grasp lever 76 and move it between its locked and unlocked positions. No outer covering for lever arm 76 is illustrated, however, when installed in a vehicle, a polymeric covering that did not interfere with the functional performance of lever arm 76 or other suitable means could be used to provide stamped sheet metal lever arm 76 with a more aesthetic appearance. Lever arm 76 also includes a mounting interface 80 which is engaged with mounting interface 75 of assembly member 51 to thereby mount lever arm 76 on assembly member 51. Mounting interface 80 of lever arm 76 includes a C-shaped profile portion 82 of lever arm 76, open-ended slot 90 and ductile tabs 88.

The C-shaped cross section or profile 82 of lever arm 76 includes a central portion 84 having a surface 85 facing assembly member 51 and two sidewalls 76 having inward facing surfaces 87. Ductile tabs 88 project from sidewalls 76 adjacent one end of C-shaped profile 82 and the open ended slot 90 is located near the opposite end of C-shaped profile 82. Lever arm 76 is secured to assembly member 51 by the biasing forces exerted by three securement members in the illustrated embodiment, two ductile tabs 88 and fastener 100. Fastener 100 is located on the driver-side of shaft 52 while tabs 88 are located on the opposite side of shaft 52.

Open ended slot 90 has a closed end 92 and an open end 94. Slot 90 defines a length 95 (FIG. 11) between closed end 92 and open end 94 and a width 93. It also defines a depth 91 that is the thickness of the material through which slot 90 extends. End 94 of slot 90 is referred to as an "open end" because width 93 expands at the open end 94 of slot 90. This expansion of the width allows for the passage of items, such as washer 106 and fastener head 104, which cannot pass through more narrow slot width between closed end 92 and open end 94. As best seen in FIGS. 10-13, open ended slot 90 forms one portion of a larger "key-hole" shaped opening. Enlarged opening 96 forms the remaining portion of "key-hole" opening. As seen in FIG. 10, enlarged opening 96 not only has an expanded width but also has a far edge that is displaced laterally by a distance 97 that is greater than the combined height of washer 106 and fastener head 104. As discussed below, this configuration facilitates the disengagement of lever arm 76 from assembly member 51 in the event that lever arm 76 is impacted by the vehicle operator or driver during a collision event.

Figure 14:
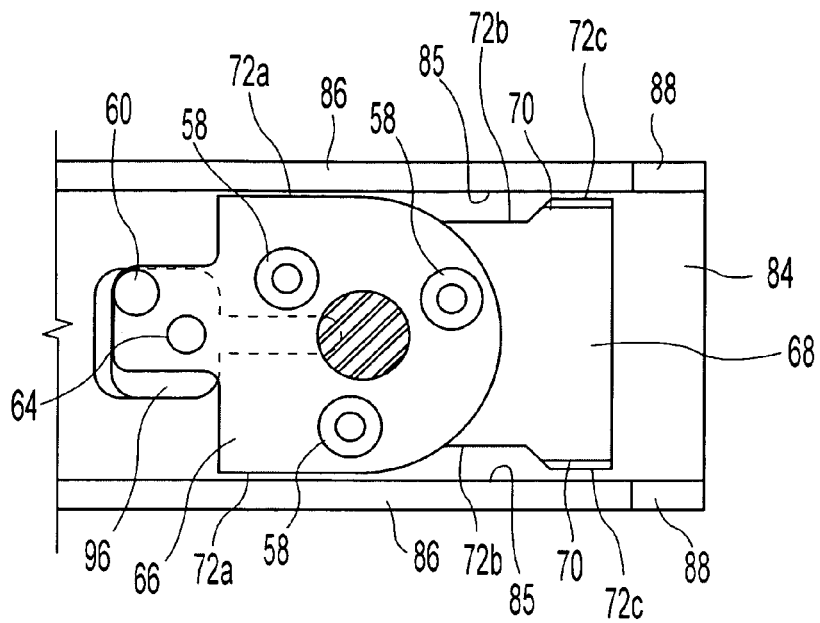
FIG. 14 is a side view of the lever arm prior to mounting on the steering column assembly.

FIG. 14 illustrates assembly member 51 and lever arm 76 prior to the mounting of lever arm 76 on assembly member 51. To mount lever arm 76 on assembly member 51, tabs 88 are aligned with ears 70 and then bent down to bias surface 74 into contact with surface 85. Tabs 88 can be compressed downwardly into engagement with ears 70 by a force having a predetermined magnitude to facilitate the control of the biasing force created thereby. Threaded fastener 100 is then inserted through slot 90 and engaged with threaded opening 64. Fastener 100 is tightened to a predetermined torque to control the biasing force created thereby. As discussed in greater detail below, by controlling these biasing forces, the threshold value at which an impact force will disengage lever arm from assembly member 51 is also controlled.

Both fastener 100 and ductile tabs 88 bias the two substantially planar surfaces 85 and 74 into direct contact. Directional lines 98 in FIG. 12 schematically depict the biasing forces exerted by securement members 88, 100. It is the frictional engagement between surfaces 85, 74 which secures lever 76 to assembly member 51 in the illustrated embodiment. As can be seen in FIG. 11, there remains a small clearance between side surfaces 72a, 72b, and 72c and sidewall surfaces 87 with sidesurfaces 72b being spaced furthest away from sidewall surfaces 87. Substantially planar surfaces 74, 85 are oriented perpendicular to rotational axis 57 of shaft 52 and side surfaces 72a, 72c are positioned close to sidewall surfaces 87 and limit the amount of potiential relative rotational movement between lever 76 and assembly member 51 if the two parts were to rotate relative to each other. In normal use conditions, however, no such relative rotation is desired and the frictional contact between surfaces 85 and 74 is intended to convey the pivotal motion of lever 76 to assembly member 51. The frictional contact between surfaces 85, 74 also prevents sliding movement between surfaces 85, 74 in a direction, indicated by line 112 in FIG. 12, transverse to the lengthwise direction of slot 90.

When lever arm 76 is impacted by a sufficiently large force in the direction indicated by arrows 110 in FIGS. 4 and 5 lever arm 76 will disengage and separate from assembly member 51 by relative translational motion. More specifically, surfaces 74, 85 will experience a relative sliding motion with assembly member 51 sliding in the direction indicated by arrow 110a relative to lever arm 76. (Although FIG. 14 shows lever arm 76 prior to mounting on member 51, it is noted that when lever arm 76 and assembly member 51 reach the relative positions shown in FIG. 14 due to an impact force being applied to a mounted lever arm 76, the lever arm will be disengaged from assembly member 51.) Assembly member 51 will typically remain attached to steering column assembly 40 and, thus, remain stationary relative to the vehicle structure to the same extent that the upper portion of steering column 40 on which adjustment assembly 50 is mounted remains stationary relative to the vehicle structure. In other words, it is lever arm 76 that will typically move relative to the vehicle structure during the disengagement event indicated by relative movement arrow 110a.

When lever arm 76 is subjected to a disengaging force, and assembly member 51 slides in direction 110a relative to lever arm 76, ductile tabs 88 will become disengaged from ears 70 and shaft 102 of fastener 100 will be displaced within slot 90 towards open end 94. After shaft 102 is displaced through open end 94, lever arm 76 will be disengaged from assembly member 51. In the illustrated embodiment, approximately 6 mm of relative displacement between lever arm 76 and assembly member 51 is required before shaft 102 passes through open end 94 and lever arm 76 is disengaged. The lateral displacement distance 97 of enlarged opening 96 allows fastener head 104 and washer 106 to pass through enlarged opening 96 after being displaced through open end 92 without any lateral movement of lever arm 76 relative to assembly member 51. In the absence of such lateral displacement 97 of opening 96, lever arm 76 would have to be laterally displaced relative to assembly member 51 to completely separate the two parts. Alternative embodiments of the present invention could employ lever arms that experience such lateral movement during disengagement. In still other alternative embodiments, open-ended slot 90 could have an open end that opened up on an outer perimeter of lever arm 76 rather than in an enlarged opening such as opening 96.

As can also be understood with reference to FIG. 10, the relative movement of lever arm 76 and assembly member 51 is in a direction 110a that is oriented perpendicular to axis 103 of shaft 102 of fastener 100. This allows fastener 100 to become disengaged from lever arm 76 by sliding through the open end 94 of slot 90 in a non-frangible manner. In other words, head 104 of fastener 100 does not have to be severed from shaft 102 of fastener 100, nor does another portion of fastener 100 have to be severed during the disengagement of lever arm 76 from assembly member 51. It is also noted that ductile tabs 88 are also fully disengaged by the relative sliding of lever arm 76 and assembly member 51 without requiring tabs 88 to be severed.

Since neither fastener 100 nor tabs 88 must be severed to disengage lever arm 76 from assembly member 51, the impact force required to separate these two parts is primarily determined by the frictional resistance to sliding motion between surfaces 74 and 85. The frictional resistance between tabs 88 and ears 70 and washer 106 and assembly member 51 are relatively minimal in comparison. The frictional coefficient between surfaces 74 and 85 can be readily determined and, once determined, the magnitude of the impact force required to disengage lever arm 76 from assembly member 51 can be controlled by controlling the force used to bias the two surfaces into engagement. It is also noted that, in the illustrated embodiment, no adhesive is used to secure lever arm 76 to assembly member 51.

Thus, the threshold value that must be exceeded by the impact force applied to lever arm 76 to disengage lever arm 76 is determined by the biasing forces exerted by ductile tabs 88 and threaded fastener 100. When bending ductile tabs 88 downward into engagement with ears 70 a force having a predetermined magnitude can be applied to control the biasing forces exerted by tabs 88. The biasing force exerted by threaded fastener 100 can be readily controlled by securing fastener 100 to a predetermined torque. When bending tabs 88 by the application of a force having a predetermined magnitude and installing threaded fastener 100 to a predetermined torque, the biasing force exerted by ductile tabs 88 is likely to be subject to greater variation than the biasing force exerted by fastener 100. By using to fastener 100 to create the majority of the force that biases surfaces 74 and 85 into engagement, the variation of the biasing force can be reduced. For example, fastener 100 can be installed to a torque such that fastener 100 exerts at least about 60 percent of the total biasing force applicable to surfaces 74 and 85. An even further reduction in variation in the biasing force can be achieved by installing fastener 100 to a predetermined torque that is at least about 80 percent of the total biasing force applicable to surfaces 74 and 85, or, in alternative embodiments, by using one or more threaded fasteners to apply the entire biasing force used to engage surfaces 74 and 85. In the illustrated embodiment, it is desired to have lever arm 76 disengage from assembly member 51 when lever arm is impacted by a force that exceeds a threshold value that falls within a range of between approximately 450 to 600 Newtons force.

If the disengagement of the mounted lever arm required a more than insubstantial force to sever a part or break an adhesive bond, the determination and control of the impact force required to disengage lever arm 76 would be more complex. Moreover, if more than a relatively insubstantial force were required to sever a part or break an adhesive bond in the disengagement of lever arm 76, that would also impose additional tolerances and complexities on the manufacturing process.

Figure 15:
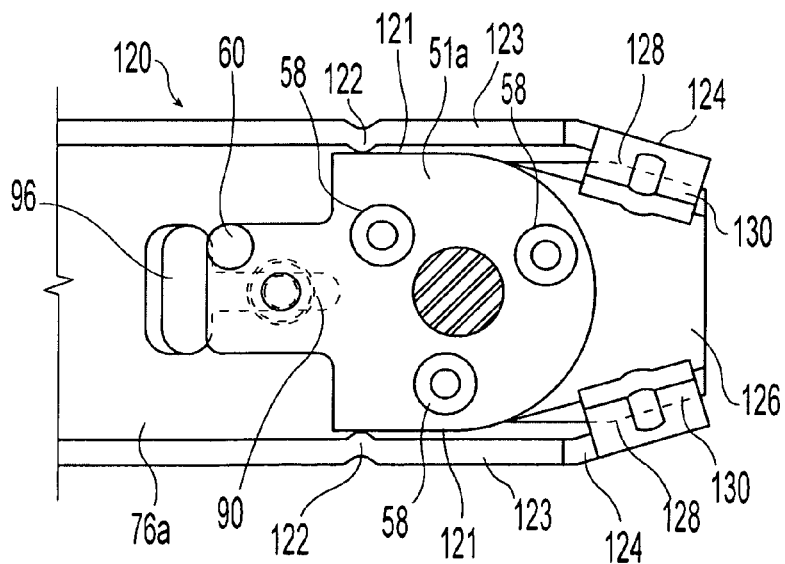
FIG. 15 is a side view of another embodiment of the lever arm.
Figure 16:
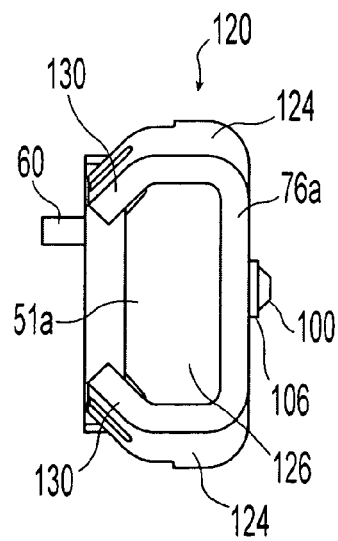
FIG. 16 is an end view of the lever arm of FIG. 15.

A second assembly 120 in accordance with the present invention is illustrated in FIGS. 15 and 16. Assembly 120 is similar to the embodiment depicted in FIGS. 4-14 with the only difference being that the mounting interfaces defined by lever arm 76a and mounting assembly member 51 have been slightly modified to provide for the efficient manufacture of the steering column assembly. More specifically, the embodiment depicted in FIGS. 15 and 16 has a lever arm 76a with inwardly projecting dimples 122 that have been formed in sidewalls 123 and inwardly slanting sidewalls 124. Similar to ductile projections 88, ductile projections 130 are located on slanted sidewalls 124 for biasing lever arm 76a and assembly member 51a into engagement. Assembly member 51a is similar to assembly member 51 but has a modified projecting end 126 which defines opposed slanted side surfaces 128 which project inwardly at substantially the same angle as sidewalls 124.

The use of dimples 122, slanted sidewalls 124 and slanted side surfaces 128 facilitate the mounting of lever arm 76a on assembly member 51a. More specifically, when mounting lever arm 76a on assembly member 51a, dimples 122 engage opposed side surfaces 121 on assembly member 51a to center one end of assembly member 51a within the C-shaped profile of lever arm 76a. Similarly engagement of slanted side surfaces 128 with inwardly slanting sidewalls 124 acts to center the opposite end of assembly member 51a within the C-shaped profile of lever arm 76a. This self-centering feature of the mounting interfaces of lever arm 76a and assembly member 51a aligns threaded opening 64 in assembly member 51a with slot 90 in lever arm 76a and thereby facilitates the installation of threaded fastener 100. The engagement of slanted side surfaces 128 with slanted sidewalls 124 prior to bending ductile tabs 130 into engagement with projecting end 126 and installation of threaded fastener 100 not only centers assembly member 51a within the C-shaped profile of lever arm 76a but also positions assembly member 51a at the desired axial position of member 51a within lever arm 76a. Thus, by engaging side surfaces 128 with sidewalls 124, threaded opening 64 will not only be properly centered between sidewalls 123 and thereby aligned with slot 90 but will also be positioned at the desired distance from open-end 94 of slot 90. As discussed above with reference to lever arm 76 and assembly member 51, the distance between threaded opening 64 (and shaft 102 of fastener 100) and open-end 94 of slot 90 defines the travel distance that lever arm 76a must slide relative to assembly member 51a to disengage lever arm 76a from assembly member 51a.

While this invention has been described as having an exemplary design, the present invention may be further modified within the spirit and scope of this disclosure. This application is therefore intended to cover any variations, uses, or adaptations of the invention using its general principles.

What is claimed is:

1. An adjustable steering column assembly comprising:
    a lever arm having a first mounting interface, said lever arm being manually repositionable between a first position and a second position;
    an adjustment assembly member operably coupled with the steering column assembly, said adjustment assembly member having a second mounting interface;
    engagement of said first and second mounting interfaces mounting said lever arm on said adjustment assembly member wherein repositioning of said lever arm between said first and second positions rotates said adjustment assembly member about a rotational axis to thereby facilitate the repositioning of the steering column assembly;
    at least one securement member operably coupled with said lever arm and said adjustment assembly member, said securement member biasing said first and second mounting interfaces into engagement;
    one of said lever arm and said adjustment assembly member defining slot having a closed perimeter, said slot defining a first portion with a width and an extending length between a first end and a second end, said slot having a second portion with a second width and a second extending length between a first end portion and a second end portion, said extending length of said first portion transverse to and intersecting said second extending length of said second portion within said closed perimeter, said securement member extending through said slot; and
    wherein applying a breakaway force exceeding a threshold value to said lever arm is configured to displace said securement member along said length of said slot toward said second end, said width of said slot at said second end being configured to facilitate movement of said securement member through said width of said second end to disengage said mounted lever arm from said adjustment assembly member.

2. The adjustable steering column assembly of claim 1 wherein at least one of said first and second mounting interfaces defines a substantially planar first surface bearingly engaged with the other of said first and second mounting interfaces, a relative translational movement between said first and second mounting interfaces comprising a relative sliding movement along planar first surface.

3. The adjustable steering column assembly of claim 2 wherein said planar first surface is oriented substantially perpendicular to said rotational axis.

4. The adjustable steering column of claim 3 wherein one of said first and second mounting interfaces defines a substantially C-shaped cross-section having a central portion and two opposing sidewall portions, said planar first surface being defined by said central portion; and
    the other of said first and second mounting interfaces defines a solid body disposed within said C-shaped cross-section, said solid body engaged with said central portion of said C-shaped cross section and having opposite first and second side surfaces respectively positioned proximate said first and second sidewall portions of said C-shaped cross-section.

5. The adjustable steering column assembly of claim 4 further comprising a threaded fastener operably coupled with said lever arm and said adjustment assembly member, said threaded fastener being installed to a predetermined torque and biasing said first and second mounting interfaces into engagement.

6. An adjustable steering column assembly comprising:
    a lever arm having a first mounting interface, said lever arm being manually repositionable between a first position and a second position;
    an adjustment assembly member operably coupled with the steering column assembly, said adjustment assembly member having a second mounting interface;
    engagement of said first and second mounting interfaces mounting said lever arm on said adjustment assembly member wherein repositioning of said lever arm between said first and second positions moves said adjustment assembly member between a locking position and an adjustment position to thereby facilitate the repositioning of the steering column assembly;

at least one securement member discrete from said lever arm and said adjustment assembly member and operably coupled with said lever arm and said adjustment assembly member wherein said securement member exerts a biasing force securely and substantially non-adhesively engaging said first and second mounting interfaces and thereby defines a biasing direction defined by the biasing force;

slot defined by one of said lever arm and said adjustment assembly member having a closed perimeter, said slot having a first portion with a width and an extending length between a first end and a second end, said slot having a second portion with a second width and a second extending length between a first end portion and a second end portion, said extending length of said first portion transverse to and intersecting said second extending length of said second portion within said closed perimeter; and wherein applying a breakaway force exceeding a threshold value to said lever arm disengages said mounted lever arm from said adjustment assembly member by relative translational movement between said first and second mounting interfaces, said relative translational movement being positioned at a non-parallel angle relative to said biasing direction and wherein disengagement of said mounted lever arm from said adjustable assembly member by the application of said threshold exceeding breakaway force is substantially non-frangibly occurable with respect to said securement member, and wherein applying the breakaway force to said lever arm displaces said securement member along said length of said slot toward said second end, said width of said slot at said second end facilitates movement of said securement member through said width of said second end to disengage said mounted lever arm from said adjustment assembly member.

7. The adjustable steering column assembly of claim 6 wherein said non-parallel angle positioned between said relative translational movement and said biasing direction is substantially perpendicular.

8. The adjustable steering column assembly of claim 7 wherein said securement member comprises a threaded fastener installed to a predetermined torque, said biasing force exerted by said threaded fastener being at least about 60% of the total biasing force acting on said first and second mounting interfaces to bias said first and second mounting interfaces into secure engagement.

9. The adjustable steering column assembly of claim 8 wherein said biasing force exerted by said threaded fastener is at least about 80% of the total biasing force acting on said first and second mounting interfaces to bias said first and second mounting interfaces into secure engagement.

10. The adjustable steering column assembly of claim 6 wherein said at least one securement member includes a fastener having a shaft, said shaft extending through said slot and biasing said first and second mounting interfaces into engagement, said shaft being displaced along said length of said slot toward said second end by the application of a threshold exceeding breakaway force.

11. The adjustable steering column assembly of claim 10 wherein said fastener is a threaded fastener installed to a predetermined torque and said biasing force exerted by said threaded fastener being at least about 60% of the total biasing force acting on said first and second mounting interfaces to bias said first and second mounting interfaces into secure engagement.

12. The adjustable steering column assembly of claim 11 wherein at least one of said first and second mounting interfaces defines a substantially planar first surface bearingly engaged with the other of said first and second mounting interfaces, said planar first surface being positioned substantially perpendicular to said biasing direction, said relative translational movement between said first and second mounting interfaces comprising a relative sliding movement along said planar first surface.

13. The adjustable steering column of claim 12 wherein one of said first and second mounting interfaces defines a substantially C-shaped cross-section having a central portion and two opposing sidewall portions, the other of said first and second mounting interfaces comprising a solid body disposed within said C-shaped cross-section, said planar first surface being defined by said central portion and each of said two opposing sidewall portions positioned to engage said solid body upon relative movement between said lever arm and said adjustment assembly member in a direction transverse to a lengthwise direction of said slot and thereby limit said relative transverse movement between said lever arm and said adjustment assembly member.

14. The adjustable steering column assembly of claim 13 wherein said at least one securement member further includes at least one ductile projection extending outwardly from at least one of said sidewalls, said at least one projection being deformed to engage said solid body and bias said solid body into engagement with said planar first surface.

15. An adjustable steering column assembly comprising:
a lever arm having a first mounting interface, said lever arm being manually repositionable between a first position and a second position;

an adjustment assembly member operably coupled with the steering column assembly, said adjustment assembly member having a second mounting interface;

engagement of said first and second mounting interfaces mounting said lever arm on said adjustment assembly member wherein repositioning of said lever arm between said first and second positions moves said adjustment assembly member between a locking position and an adjustment position to thereby facilitate the repositioning of the steering column assembly;

a fastener having a threaded shaft, said threaded shaft defining a shaft axis, said fastener being operably coupled with said lever arm and said adjustment assembly member, said fastener being installed to a predetermined torque and exerting a biasing force parallel with said shaft axis on said lever arm and said adjustment assembly member and thereby securely engaging said first and second mounting interfaces;

wherein one of said lever arm and said adjustment assembly member defines slot having a closed perimeter, said slot having a first portion with a width and an extending length between a first end and a second end, said slot having a second portion with a second width and a second axially extending length between a first end portion and a second end portion, said axially extending length of said first portion intersecting said second axially extending length of said second portion within said closed perimeter; and wherein applying a breakaway force exceeding a threshold value to said lever arm is configured to disengage said mounted lever arm from said adjustment assembly member by relative translational movement between said first and second mounting interfaces, said relative translational movement being at a non-parallel angle to said shaft axis, and wherein applying the breakaway force to said lever arm is configured to displace said fastener along said length of said slot toward said second end, said width of said slot at said second end configured to facilitate movement of said fastener through said width of said second end to disengage said mounted lever arm from said adjustment assembly member.

16. The adjustable steering column assembly of claim 15 wherein said non-parallel angle between said relative translational movement and said shaft axis is a substantially perpendicular angle.

17. The adjustable steering column assembly of claim 16 wherein disengagement of said mounted lever arm from said adjustable assembly member by the application of a threshold exceeding breakaway force occurs non-frangibly with respect to said fastener.

18. The adjustable steering column assembly of claim 1 wherein the width and the extending length are generally transverse to one another.

* * * * *